US009511890B2

(12) United States Patent
Gill et al.

(10) Patent No.: US 9,511,890 B2
(45) Date of Patent: Dec. 6, 2016

(54) BLOW MOLDED RECTANGULAR CONTAINER

(75) Inventors: Matthew T. Gill, Hellam, PA (US); Edward J. Roubal, III, Stewartstown, PA (US); Raymond A. Pritchett, Jr., Brogue, PA (US); Larry M. Taylor, Landisville, PA (US); Jeffrey Snyder, Dallastown, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 316 days.

(21) Appl. No.: 13/036,722

(22) Filed: Feb. 28, 2011

(65) Prior Publication Data

US 2012/0219734 A1 Aug. 30, 2012

(51) Int. Cl.
| B65D 41/56 | (2006.01) |
| B65D 1/10 | (2006.01) |
| B29C 49/04 | (2006.01) |

(52) U.S. Cl.
CPC ............... B65D 1/10 (2013.01); *B29C 49/04* (2013.01); *Y10T 428/13* (2015.01)

(58) Field of Classification Search
CPC ....... B65D 1/0246; B65D 1/023; B29C 49/06; B29C 49/50; B29C 2793/009
USPC .... 215/40, 43, 11.3; 383/203, 204, 210.1, 5, 383/6, 61.2, 63; 426/117, 123; 24/399, 400, 24/585.1, 585.12; 220/324, 620, 669, 675, 220/831, 835, 836, 837; D7/629; D9/428, 542
See application file for complete search history.

(56) References Cited

U.S. PATENT DOCUMENTS

| 3,424,341 | A | | 1/1969 | Slapnik |
| 4,157,762 | A | * | 6/1979 | Robinson ....................... 220/669 |
| 4,738,370 | A | * | 4/1988 | Urmston et al. .............. 215/307 |
| D303,762 | S | * | 10/1989 | Cardinal ........................ D9/542 |
| 4,976,370 | A | * | 12/1990 | Cassel ...................... B65D 1/22 220/792 |
| 5,242,074 | A | * | 9/1993 | Conaway et al. ............. 220/840 |
| 5,740,933 | A | * | 4/1998 | Conti ................... B65D 50/061 215/224 |
| D407,974 | S | | 4/1999 | Zimmer et al. |
| 5,975,346 | A | | 11/1999 | Imperato et al. |

(Continued)

FOREIGN PATENT DOCUMENTS

| DE | 82 35 047 U1 | 5/1983 |
| FR | 2 305 366 A1 | 10/1976 |
| WO | 01/74670 A2 | 10/2001 |

OTHER PUBLICATIONS

International Search Report dated Jan. 9, 2013 for corresponding PCT/US2011/067854 filed Dec. 29, 2011.

*Primary Examiner* — Fenn Mathew
*Assistant Examiner* — Cynthia Collado
(74) *Attorney, Agent, or Firm* — Baker Botts L.L.P.

(57) ABSTRACT

An extrusion blow molded plastic container includes a main body portion, a finish portion, and a continuous ledge. The finish portion defines an opening, and includes an upper surface and an outer surface that defines a substantially rectangular shape with rounded corners when viewed in transverse cross-section. The shape of the finish portion when viewed in transverse cross-section is smaller than the shape of the main body portion. The continuous ledge is defined between the outer surface of the main body portion and the outer surface of the finish portion. The ledge has a first width, adjacent to one of the rounded corners of the finish portion, that is greater than a second width that is not adjacent to one of the rounded corners of the finish portion.

22 Claims, 7 Drawing Sheets

(56) References Cited

U.S. PATENT DOCUMENTS

| | | | |
|---|---|---|---|
| 5,979,690 A * | 11/1999 | Hartley | B65D 21/0219 206/508 |
| D449,521 S | 10/2001 | Pinkus et al. | |
| D465,153 S | 11/2002 | Meeker et al. | |
| 6,495,089 B1 * | 12/2002 | Crider | 264/531 |
| D469,320 S * | 1/2003 | Pettaweebuncha | D7/629 |
| D473,140 S * | 4/2003 | Gilliam et al. | D9/428 |
| 6,669,049 B2 * | 12/2003 | Crider | 220/833 |
| D484,797 S | 1/2004 | Kipperman et al. | |
| 6,761,279 B1 | 7/2004 | Martin et al. | |
| 6,761,283 B1 * | 7/2004 | Gilliam et al. | 220/837 |
| D504,318 S | 4/2005 | Lane et al. | |
| 7,080,754 B2 * | 7/2006 | Lown | 220/835 |
| 7,100,791 B2 * | 9/2006 | Berger | B65F 1/122 220/380 |
| D543,860 S | 6/2007 | Pacente et al. | |
| D544,790 S | 6/2007 | Bouveret et al. | |
| D552,468 S | 10/2007 | Seum et al. | |
| D560,491 S | 1/2008 | Munford et al. | |
| D571,226 S | 6/2008 | Bartolucci et al. | |
| D582,783 S | 12/2008 | Little et al. | |
| D587,567 S | 3/2009 | Peyser et al. | |
| 7,796,319 B2 * | 9/2010 | MacKinnon | F21S 10/02 359/239 |
| 7,798,319 B1 * | 9/2010 | Bried | A24F 23/00 131/352 |
| 7,802,695 B2 * | 9/2010 | Baker | B65D 1/30 220/23.4 |
| 8,127,961 B2 * | 3/2012 | Vovan | B65D 43/0206 220/212 |
| 8,251,245 B2 * | 8/2012 | DiPietro | B65D 43/0212 220/255 |
| 8,308,008 B2 * | 11/2012 | Perry | B65D 43/169 206/508 |
| 2004/0091565 A1 * | 5/2004 | Crider | 425/535 |
| 2005/0077282 A1 | 4/2005 | Keller et al. | |
| 2007/0295721 A1 * | 12/2007 | Van Handel | B65D 1/265 220/23.6 |
| 2007/0295724 A1 * | 12/2007 | Tianhua | B65D 90/0033 220/23.91 |
| 2010/0308044 A1 * | 12/2010 | Perry | B65D 1/42 220/200 |

* cited by examiner

BLOW MOLDED RECTANGULAR CONTAINER

BACKGROUND OF THE INVENTION

1. Field of the Invention

This invention relates generally to the field of blow molded plastic containers, and more specifically to a rectangular blow molded plastic container that has improved resistance to deformation such as saddling.

2. Description of the Related Technology

The extrusion blow molding process involves capturing a portion of a hot, continuously extruded parison of plastic material in a moving mold, which may be mounted on a shuttle or a rotating wheel. The captured plastic material is inflated against the interior of the mold, forming a hollow article. Flash material is typically trimmed from the article after it has been ejected from the mold.

Various consumer products, such as food products, are packaged for sale in extrusion blow molded plastic containers that are sealed with a closure. One type of such container is shown in FIG. 6. It includes a generally rectangular main body portion and a finish portion that has a circumferentially extending snap bead. The finish portion has an upper surface that defines a rim framing an opening that provides access to the interior of the container.

One problem that has persisted in the manufacture of containers of the type that are shown in FIG. 6 is that the central portions of the upper rim tend to develop a concave shape, especially on the long sides of the container. This phenomenon is known as saddling, and it adversely affects the ability of a closure to form a good seal with the upper surface of the finish portion. The saddling is visible in the finite element analysis display that is provided in FIG. 6.

A need exists for an improved blow molded rectangular plastic container that exhibits superior resistance to saddling during the molding process.

SUMMARY OF THE INVENTION

Accordingly, it is an object of the invention to provide an improved blow molded rectangular plastic container that exhibits superior resistance to saddling during the molding process.

In order to achieve the above and other objects of the invention, an extrusion blow molded plastic container according to a first aspect of the invention includes a main body portion and a finish portion that defines an opening. The finish portion has an upper surface and an outer surface on which a snap bead is defined. A plurality of grooves is defined in the outer surface, each of the grooves passing through the snap bead.

An extrusion blow molded plastic container according to a second aspect of the invention includes a main body portion that has an outer surface defining a substantially rectangular shape with rounded corners when viewed in transverse cross-section. The container further has a finish portion defining an opening. The finish portion has an upper surface and an outer surface that defines a substantially rectangular shape with rounded corners when viewed in transverse cross-section. The shape of the finish portion when viewed in transverse cross-section is smaller than the shape of the main body portion. The container further has a ledge defined between the outer surface of the main body portion and the outer surface of the finish portion. The ledge has a first width, adjacent to one of the rounded corners of the finish portion, which is greater than a second width that is not adjacent to one of the rounded corners of the finish portion.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
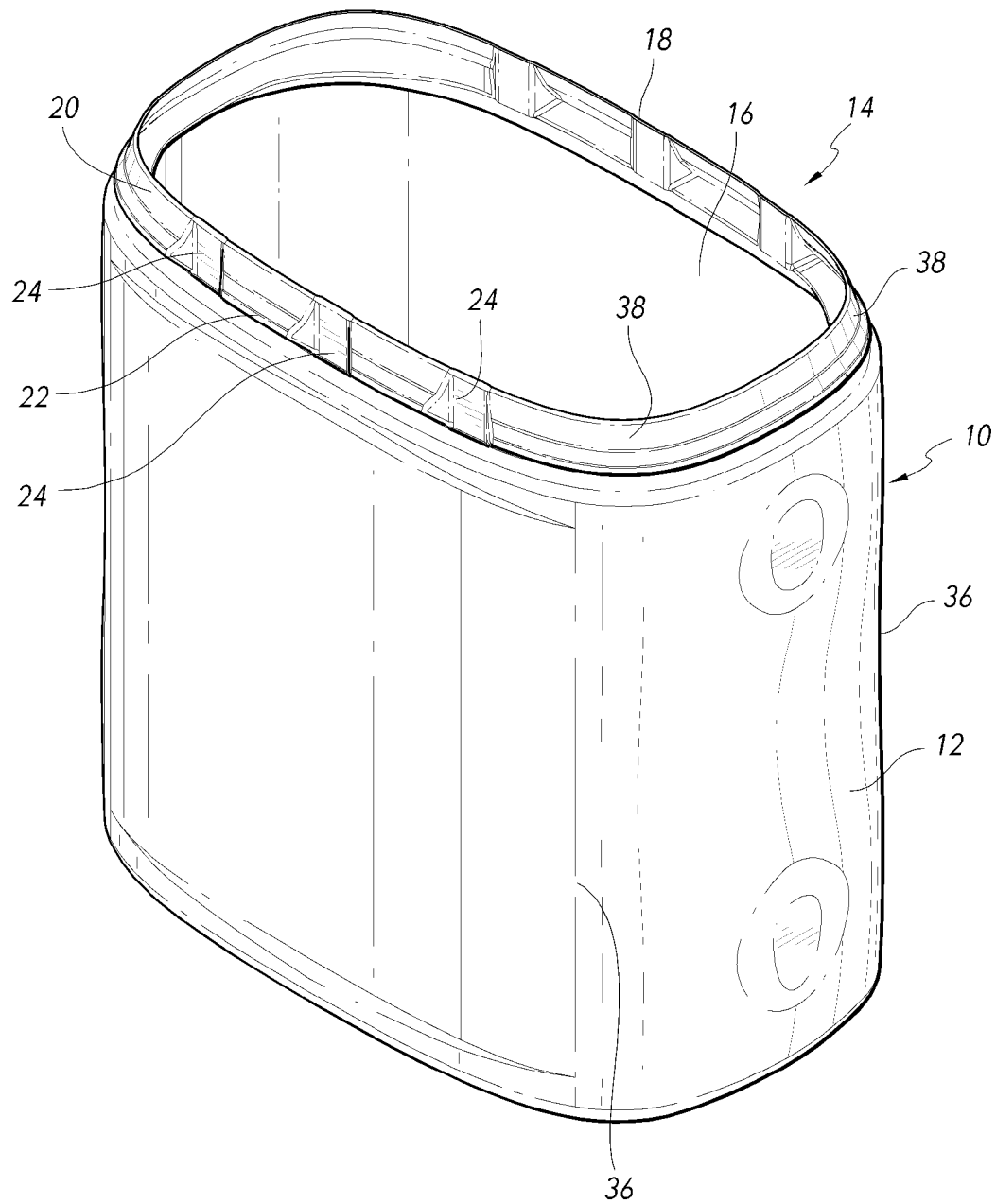
FIG. 1 is a perspective view of a container that is constructed according to a preferred embodiment of the invention.
Figure 2:
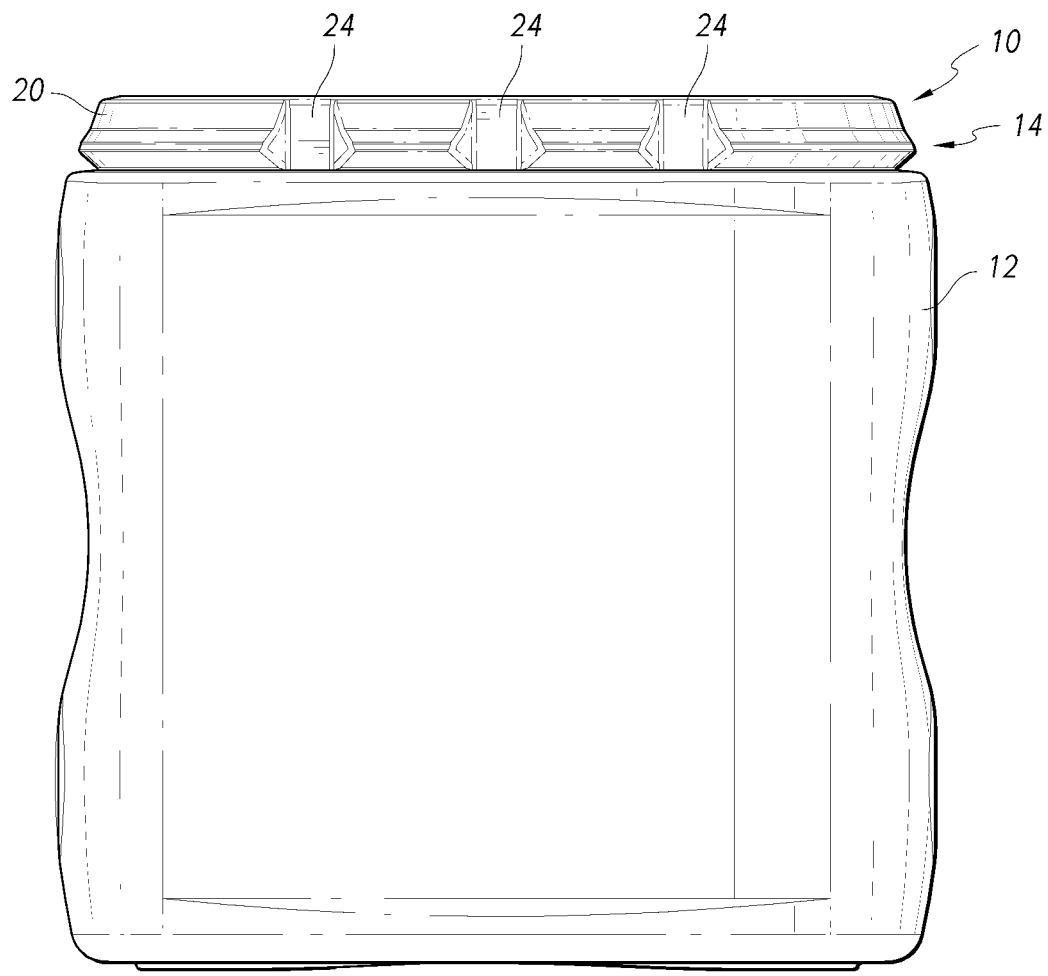
FIG. 2 is a front elevational view of the container that is shown in FIG. 1.

Referring now to the drawings, wherein like reference numerals designate corresponding structure throughout the views, and referring in particular to FIG. 1, an extrusion blow molded rectangular plastic container 10 includes a main body portion 12 and a finish portion 14 defining an opening 16 that provides access to a hollow interior of the container 10.

The finish portion 14 has an upper surface 18 that defines a rim framing the opening 16. The finish portion 14 also has an outer surface 20 on which a generally circumferentially extending snap bead 22 is defined. The snap bead 22 projects radially outwardly from adjacent areas of the finish portion 14, and preferably substantially resides within a horizontal plane that is transverse to a longitudinal axis of the container 10.

Figure 3:
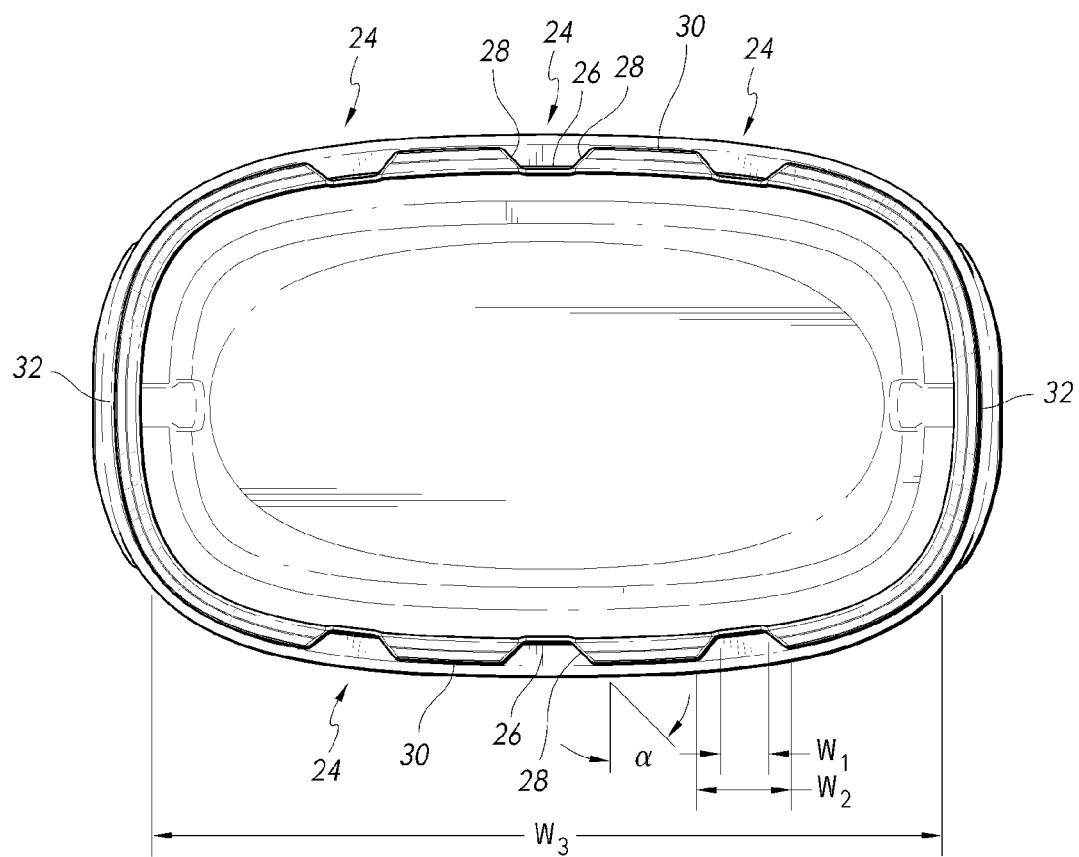
FIG. 3 is a top plan view of the container that is shown in FIG. 1.

A plurality of grooves 24 are preferably defined in the outer surface 20 of the finish portion 14. Each of the grooves 24 preferably passes through the snap bead 22. Each of the grooves 24 preferably has a substantially vertical orientation. As is best shown in FIG. 3, at least one of the plurality of grooves 24 is preferably tapered, having a first, inner width $W_1$ and a second, outer width $W_2$ that is greater than the inner width $W_1$. The inner width W1 represents the maximum transverse extent of a bottom surface 26 of the groove 24.

The groove 24 further includes a pair of side surfaces 28 that are angled outwardly from the bottom surface 26 when viewed in transverse cross-section at an angle α. Angle α is preferably substantially within a range of about 30° to about 60°, more preferably substantially within a range of about 35° to about 55° and most preferably substantially within a range of about 40° to about 50°.

As FIG. 3 best shows, finish portion 14 preferably has a first pair of long sides 30 and a second pair of shorts sides 32. The plurality of grooves 24 is preferably positioned on at least one of the long sides 30, and more preferably a first plurality of groove 24 is provided on the first long side 30 and a second plurality of grooves 24 is provided on the second long side 30. The first and second pluralities of grooves 24 are preferably symmetrical with respect to each other. Preferably, no groove 24 is provided on either of the short sides 32.

The first plurality of grooves preferably includes three grooves 24, and the second plurality of grooves also preferably includes three grooves 24.

Referring again to FIG. 3, it will be seen that each of the long sides 30 of the finish portion 14 has a first width $W_3$. Preferably, a ratio of the sum of the maximum widths $W_1$ of the bottom surfaces 26 of the grooves 24 on each of the long sides 30 to the first width $W_3$ is substantially within a range of about 0.1 to about 0.4, more preferably substantially within a range of about 0.15 to about 0.35 and most preferably substantially within a range of about 0.2 to about 0.3.

As FIG. 1 shows, the main body portion 12 has an outer surface that defines a substantially rectangular shape with rounded corners 36 when viewed in transverse cross-section. The outer surface 20 of the finish portion 14 also has a generally rectangular shape with rounded corners 38 when viewed in transverse cross-section.

Figure 4:
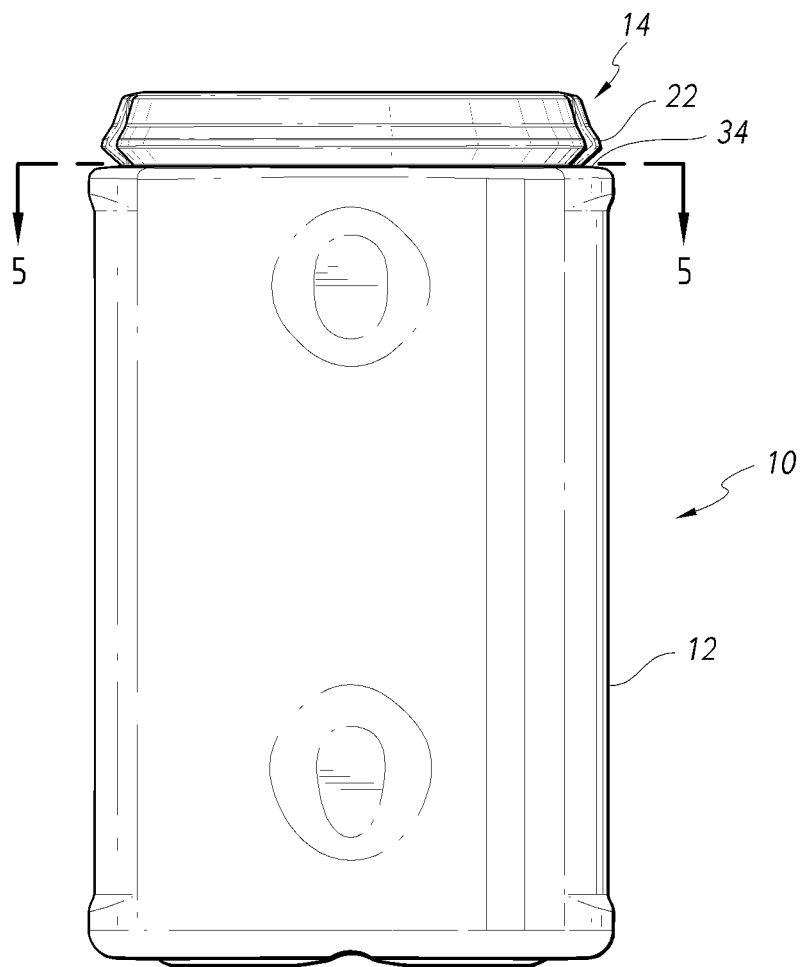
FIG. 4 is a side elevational view of the container that is shown in FIG. 1.
Figure 5:
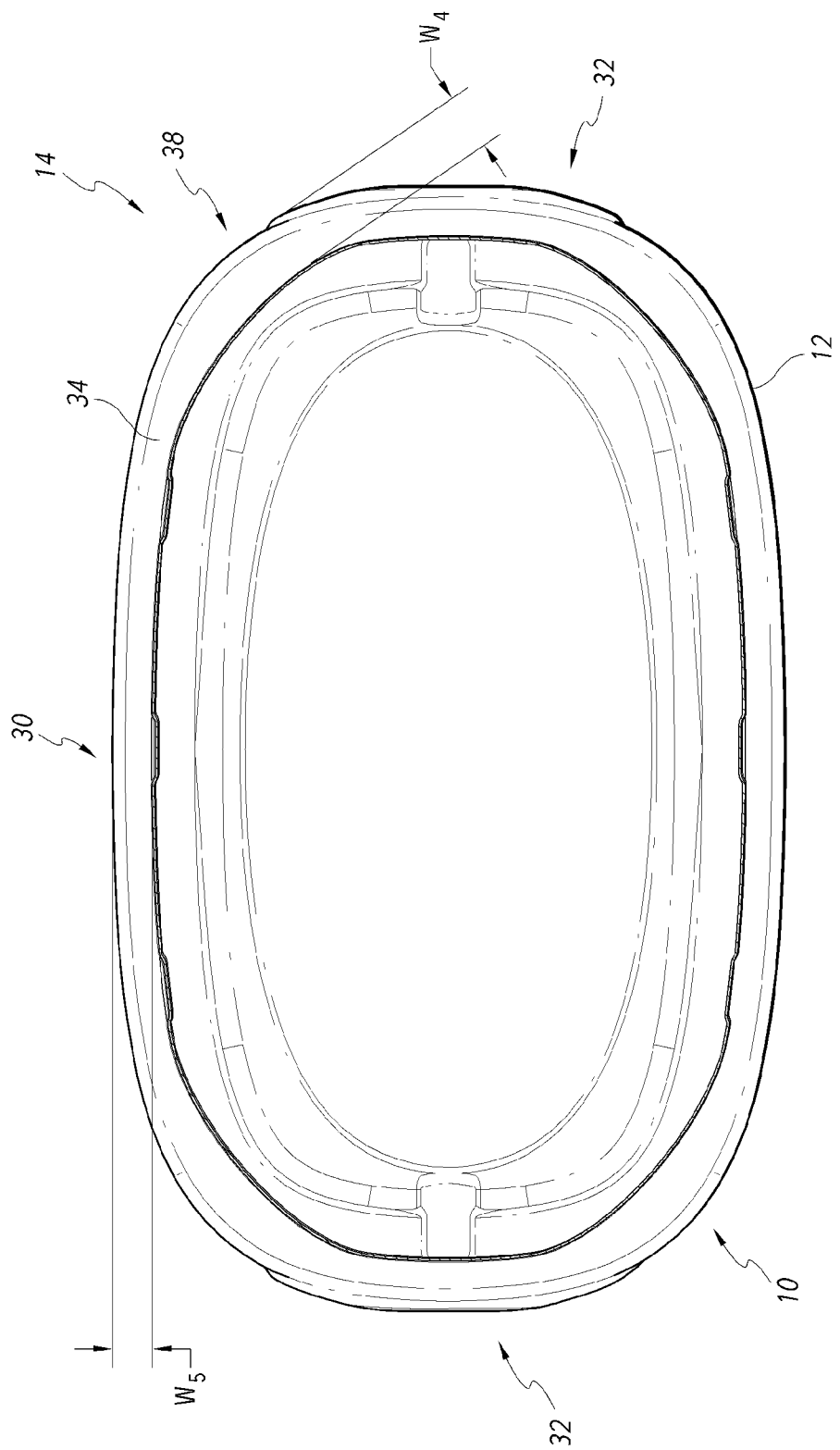
FIG. 5 is a cross-sectional view taken along lines 5-5 in FIG. 4.
Figure 6:
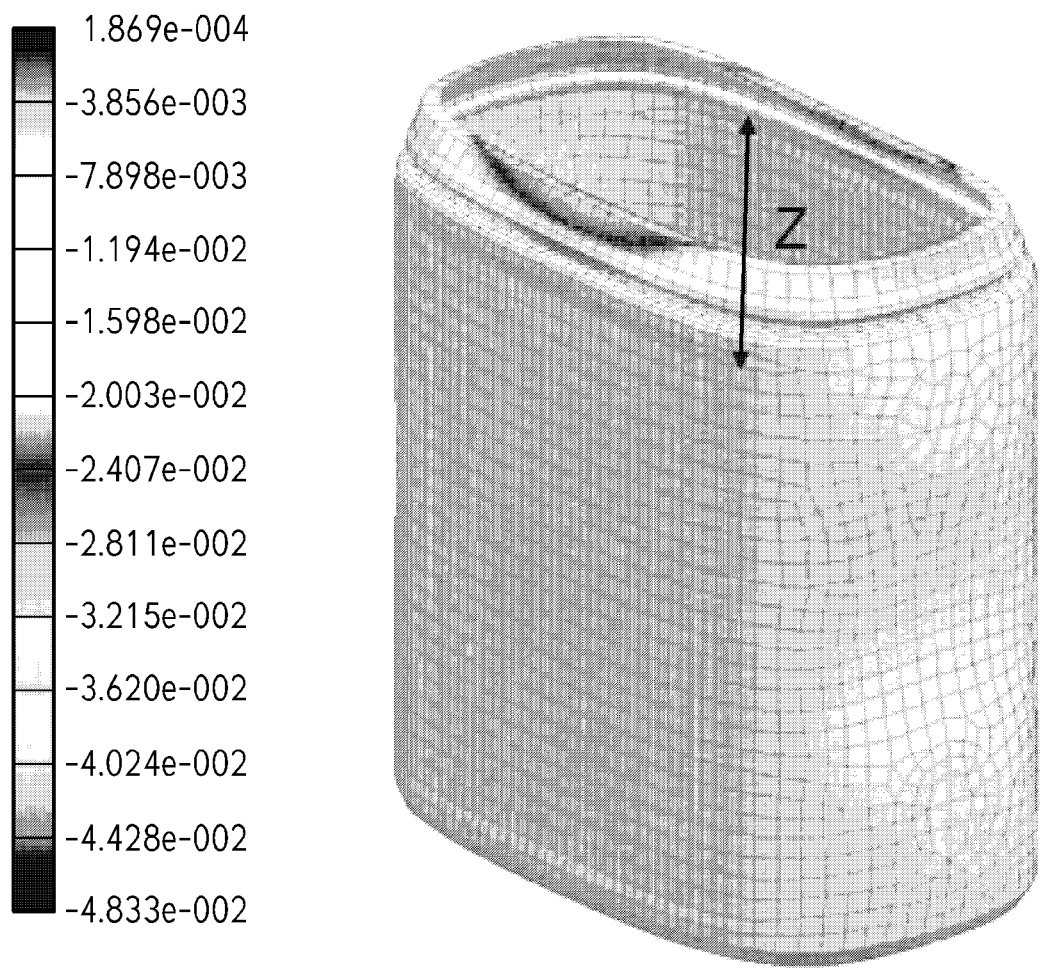
FIG. 6 is a finite element analysis display depicting saddling occurring in a conventional rectangular blow molded container.

As FIGS. 4 and 5 best show, a ledge 34 is defined between an upper end of the outer surface of the main body portion 12 and the lower end of the outer surface of the finish portion 14. Ledge 34 has a first, maximum width $W_4$ that is adjacent to one of the rounded corners 38 of the finish portion 14, and a second maximum width $W_5$ that is located away from the rounded corners 38. Second maximum width $W_5$ in the preferred embodiment is located on one of the long sides 30 of the finish portion 14. The first width $W_4$ is preferably greater than the second width $W_5$. Preferably, a difference between the first width $W_4$ and the second width $W_5$ is substantially within a range of about 0.01 inch to about 0.3 inch, more preferably substantially within a range of about 0.03 inch to about 0.2 inch and most preferably substantially with a range of about 0.07 inch to about 0.15 inch.

Figure 7:
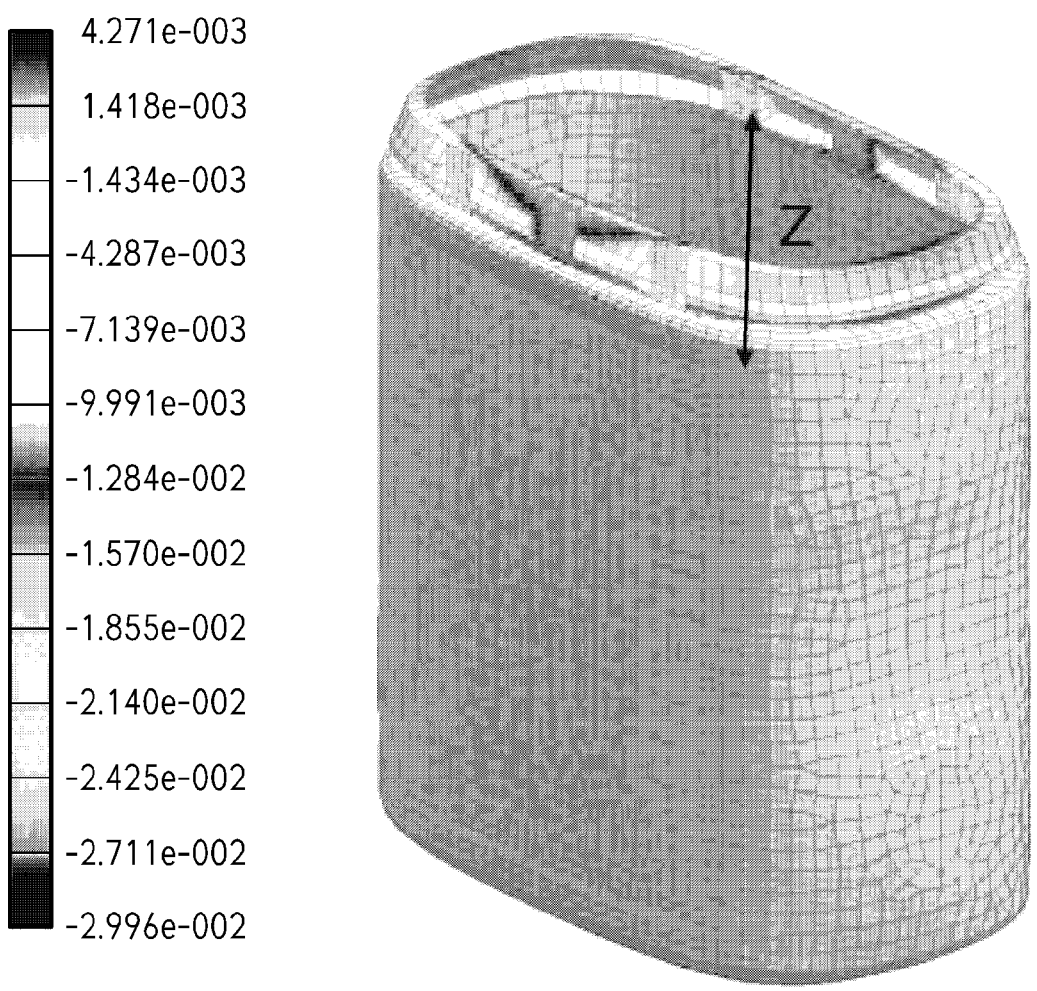
FIG. 7 is a finite element analysis display depicting the reduction of settling that is achieved in a container that is constructed according to the embodiment of FIG. 1.

FIG. 7 is a finite element analysis display depicting the reduced extent of saddling that occurs turning the manufacture of a container that is constructed according to the embodiment of FIG. 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An extrusion blow molded plastic container, comprising:
    a main body portion, said main body portion having an outer surface defining a substantially rectangular shape with rounded corners when viewed in transverse cross-section;
    a finish portion defining an opening, the finish portion having an upper surface and an outer surface that defines a substantially rectangular shape with rounded corners when viewed in transverse cross-section, the shape of the finish portion when viewed in transverse cross-section being smaller than the shape of the main body portion; and
    a continuous ledge defined along an entire perimeter of the container between the outer surface of the main body portion and the outer surface of the finish portion, and wherein the ledge has a first maximum width at one of the rounded corners of the finish portion, and a second maximum width at a long side of the container, wherein the first maximum width is greater than the second maximum width, where the outer surface of the finish portion has a snap bead defined thereon.

2. An extrusion blow molded plastic container according to claim 1, wherein a difference between the first width and the second width is substantially within a range of about 0.01 inch to about 0.3 inch.

3. An extrusion blow molded plastic container according to claim 2, wherein the difference between the first width and the second width is substantially within a range of about 0.03 inch to about 0.2 inch.

4. An extrusion blow molded plastic container according to claim 3, wherein the difference between the first width and the second width is substantially within a range of about 0.07 inch to about 0.15 inch.

5. An extrusion blow molded plastic container according to claim 1, wherein the outer surface of the finish portion further has a plurality of grooves defined therein, each of the grooves passing through the snap bead.

6. An extrusion blow molded plastic container according to claim 5, wherein each of the plurality of grooves has a substantially vertical orientation.

7. An extrusion blow molded plastic container according to claim 5, wherein the plurality of grooves are defined on a long side of the finish portion, the long side having a first width, each of the grooves having a bottom surface that has a maximum width when viewed in transverse cross-section, and wherein a ratio of a sum of the maximum widths of the grooves to the first width is substantially within a range of about 0.1 to about 0.4.

8. An extrusion blow molded plastic container according to claim 7, wherein the ratio is substantially within a range of about 0.15 to about 0.35.

9. An extrusion blow molded plastic container according to claim 8, wherein the ratio is substantially within a range of about 0.2 to about 0.3.

10. An extrusion blow molded plastic container, comprising:
    a main body portion;
    a finish portion defining an opening, the finish portion having an upper surface and an outer surface on which an outwardly projecting snap bead is defined about the finish portion wherein the finish portion when viewed in transverse cross section has a pair of long sides and a pair of short sides having a shorter length relative to the long sides; and
    a plurality of grooves defined in the outer surface at least along one of the long sides of the finish portion and configured to interrupt the snap bead into a plurality of snap bead segments, wherein the plurality of grooves are configured to inhibit saddling of the at least one long side of the finish portion.

11. An extrusion blow molded plastic container according to claim 10, wherein each of the plurality of grooves has a substantially vertical orientation.

12. An extrusion blow molded plastic container according to claim 10, wherein at least one of the plurality of grooves is tapered, having a first inner width and a second outer width that is greater than the first inner width.

13. An extrusion blow molded plastic container according to claim 10, wherein at least one of a plurality of grooves has a bottom surface and a pair of side surfaces, and wherein at least one of the side surfaces is oriented at a first angle with respect to the bottom surface when viewed in transverse cross-section, the first angle being substantially within a range of about 30° to about 60°.

14. An extrusion blow molded plastic container according to claim 13, wherein the first angle is substantially within a range of about 35° to about 55°.

15. An extrusion blow molded plastic container according to claim 14, wherein the first angle is substantially within a range of about 40° to about 50°.

16. An extrusion blow molded plastic container according to claim 10, wherein no groove is positioned on either of the short sides.

17. An extrusion blow molded plastic container according to claim 10, wherein a first plurality of grooves is defined in the outer surface of the finish portion on a first of the long sides, and a second plurality of grooves is defined in the outer surface of the finish portion on a second of the long sides.

18. An extrusion blow molded plastic container according to claim 17, wherein the first plurality of grooves comprises at least three grooves, and second plurality of grooves comprises at least three grooves.

19. An extrusion blow molded plastic container according to claim 10, wherein the plurality of grooves are defined on a long side of the finish portion, the long side having a first width, each of the grooves having a bottom surface that has a maximum width when viewed in transverse cross-section, and wherein a ratio of a sum of the maximum widths of the grooves to the first width is substantially within a range of about 0.1 to about 0.4.

20. An extrusion blow molded plastic container according to claim 19, wherein the ratio is substantially within a range of about 0.15 to about 0.35.

21. An extrusion blow molded plastic container according to claim 20, wherein the ratio is substantially within a range of about 0.2 to about 0.3.

22. The extrusion blow molded plastic container of claim 10, wherein each of the plurality of grooves pass completely through the snap bead.

\* \* \* \* \*